Jan. 6, 1970  H. DARDA  3,488,093
PRESSURE BREAKER
Original Filed June 21, 1967  3 Sheets-Sheet 3

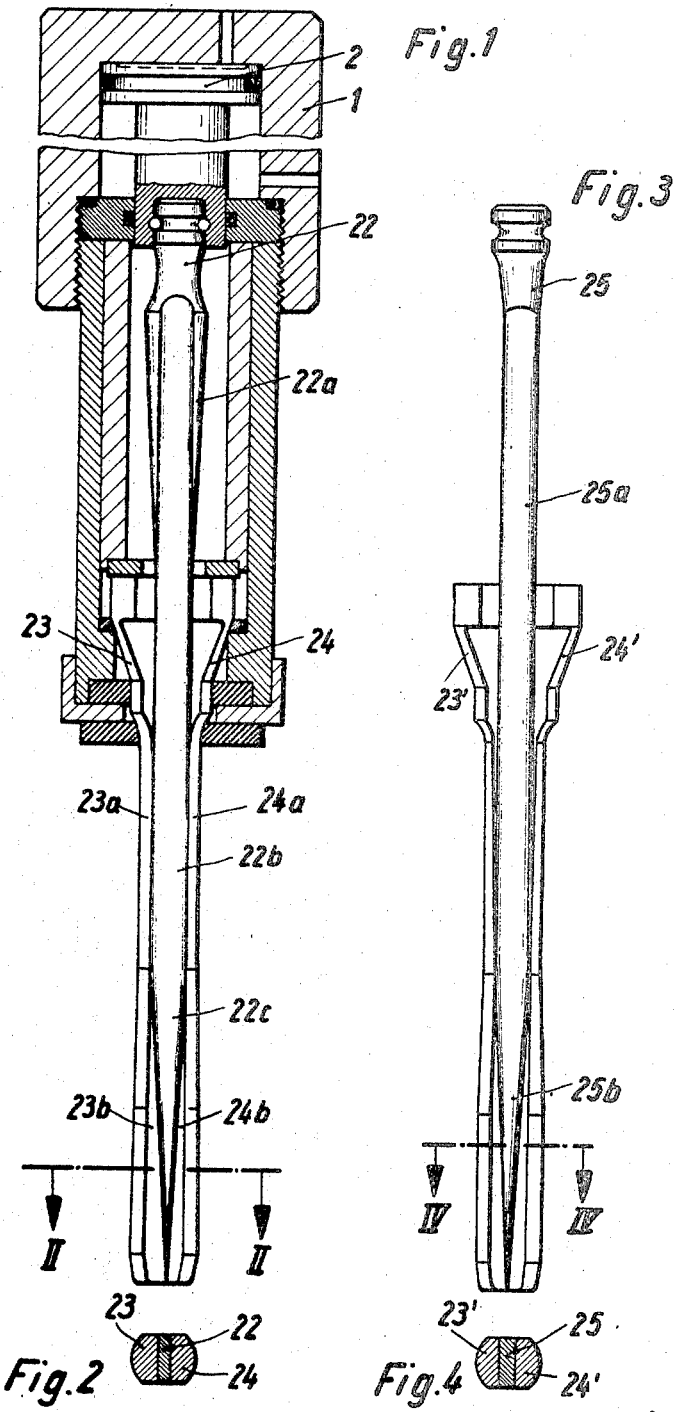

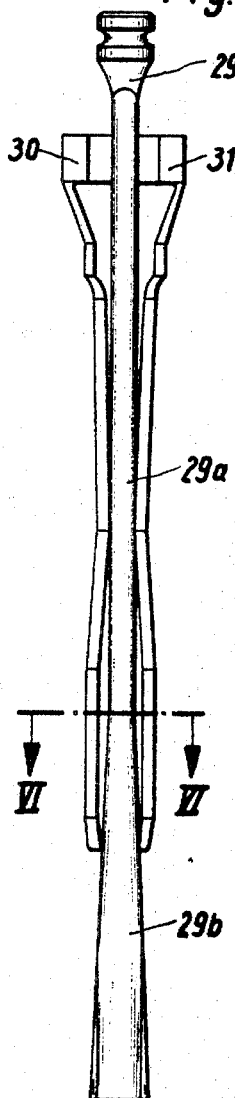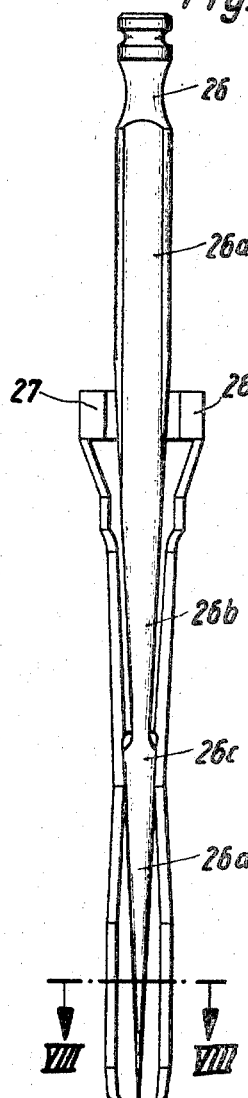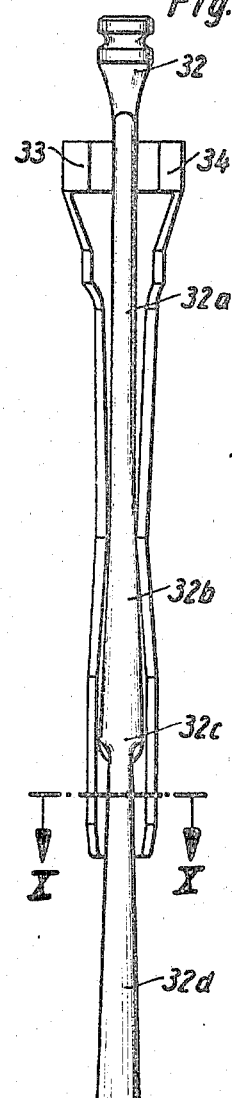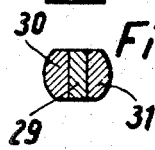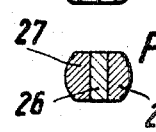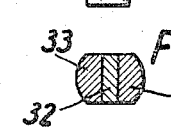

Inventor:
HELMUT DARDA

By: Michael S. Striker
Attorney

United States Patent Office 3,488,093
Patented Jan. 6, 1970

3,488,093
PRESSURE BREAKER
Helmut Darda, Nordwerk, Blumberg, Baden, Germany
Original application June 21, 1967, Ser. No. 648,537.
Divided and this application Feb. 14, 1969, Ser.
No. 799,347
Int. Cl. E21d 37/10
U.S. Cl. 299—22                                17 Claims

ABSTRACT OF THE DISCLOSURE

A pressure breaker which comprises an expander insertable into a hole drilled into a rocky formation and includes several pressure bars, a wedge-like spreader which is received between the pressure bars, and a cylinder and piston unit which can move the spreader lengthwise of the expander. The spreader has several groups of longitudinally spaced external surfaces and the surfaces of each group make with each other an angle which is different from the angle between the surfaces of another group. The pressure bars have internal surfaces cooperating with the external surfaces of the spreader to increase the transverse dimensions of the expander on lengthwise movement of the spreader so that the pressure bars exert pressure against and crack the material which surrounds the drill hole.

CROSS-REFERENCE TO RELATED APPLICATION

This invention relates to improvements in pressure breakers disclosed in my copending application Ser. No. 570,353, filed on Aug. 4, 1966 for Hydraulically Actuated Tool for the Mechanical Crushing of Rocks by Means of a Wedge Slidable Through Insert Pieces now Patent No. 3,414,328, granted Dec. 3, 1968.

The present application is a division of my copending application Ser. No. 648,537, filed June 21, 1967.

BACKGROUND OF THE INVENTION

The present invention relates to improvements in fluid-operated tools, also called pressure breakers, which are utilized to crack rock or like formations.

It is already known to employ in quarries or mines hydraulically actuated tools which are insertable into drill holes to form cracks in large blocks of rock or ore. As a rule, the formation to be broken up is provided with a series of drill holes located in the plane in which the formation is to be cracked, and the operators drive into such holes suitable wedges to form a fissure. In accordance with a presently preferred procedure, drill holes receive pressure bars with a wedge-like spreader therebetween. When the spreader is moved lengthwise, it acts against the pressure bars and causes them to exert pressure against material which surrounds the drill hole. Such pressure breakers are disclosed, for example, in German Patent No. 960,167 or in U.S. Patent No. 2,385,753.

A serious drawback of presently known pressure breakers is that they cannot be inserted into drill holes of small diameter. The number of man hours and the wear upon drilling tools are directly proportional to the diameter of a drill hole, i.e., it is highly desirable to construct a pressure breaker in such a way that it can form cracks in a formation which is provided with one or more drill holes of small diameter.

In the pressure breaker of the aforementioned U.S. Patent No. 2,385,753, a single wedge-like spreader is separated from the pressure bars by flanged roller bearings which occupy much room and prevent insertion of pressure bars into a small-diameter hole. Furthermore, and in order to successfully withstand stresses which arise when the spreader is shifted relative to the pressure bars, the bearing must be rather large and rugged which also contributes to bulkiness of such pressure breakers. Moreover, the bearings are rapidly damaged or destroyed by dust or other foreign matter which penetrates between the spreader and the pressure bars. It was found that such pressure breakers cannot be used in drill holes which are not absolutely straight. Since the drilling tools are normally held by hand, it happens again and again that the hole is not entirely straight.

My aforementioned copending application Ser. No. 570,353 discloses a hydraulically actuated pressure breaker which constitutes an improvement over the pressure breaker of U.S. Patent No. 2,385,753. The improved pressure breaker need not utilize bearings between the pressure bars and the spreader. However, it was found that my pressure breaker requires further modifications and improvements, for example, as regards its utilization in relatively long drill holes.

SUMMARY OF THE INVENTION

It is an important object of my invention to provide a novel and improved pressure breaker which can be inserted into straight drill holes or into drill holes which are not absolutely straight and which can be inserted into and successfully employed in very long drill holes of small diameter.

Another object of the invention is to provide a pressure breaker which can concentrate the cracking or expanding force in a desired section of the drill hole, which can exert simultaneous pressure against two or more longitudinally spaced portions of material which surrounds the drill hole, whose effective length may be varied at will and within a desired range, and which can be manipulated by persons having little technical skill.

A further object of the invention is to provide a pressure breaker which can exert substantial stresses against the material surrounding a drill hole as soon as its spreader begins to move relative to the pressure bars.

An additional object of the invention is to provide a pressure breaker wherein the spreader can move the pressure bars apart while being subjected to tensional stresses.

A concomitant object of the invention is to provide a pressure breaker which can utilize spreaders which are much longer than the spreaders of presently known pressure breakers but without necessitating the drilling of large-diameter holes.

A further object of the invention is to provide novel inserts which can be used with the pressure breaker to effect further propagation of partial cracks or to form cracks in formations wherein a conventional pressure breaker cannot do the work.

Another object of my invention is to provide a pressure breaker wherein one or more parts can be conveniently and rapidly detached or reapplied without resorting to any tools or by resorting to readily available tools, and wherein individual parts can be replaced without necessitating even partial dismantling of the remaining parts.

The improved pressure breaker is particularly suited for cracking of rocky or like formations which are provided with drill holes. It comprises an elongated expander which is insertable into a drill hole and includes a plurality of elongated pressure bars, a wedge-like spreader which is received between the pressure bars, and operating means for effecting relative movement between the spreader and the expander and including a fluid-actuated cylinder and a piston connected with the spreader and reciprocably received in the cylinder. In accordance with a feature of my invention, the spreader is formed with at least two groups of longitudinally spaced external surfaces and the surfaces of each group make with each other an angle which is different from the angle between the surfaces of another group. The pressure bars have at least one group of internal surfaces which cooperate with the external surfaces of the spreader to increase the transverse dimensions of the expander in response to relative movement between the spreader and the pressure bars so that the pressure bars exert pressure against and crack the material around the drill hole.

The novel features which are considered as characteristic of the invention are set forth in particular in the appended claims. The improved pressure breaker itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a pressure breaker which embodies one form of my invention;

FIG. 2 is a transverse sectional view as seen in the direction of arrows from the line II—II of FIG. 1;

FIG. 3 is a fragmentary axial sectional view of a second pressure breaker;

FIG. 4 is a transverse view as seen in the direction of arrows from the line IV—IV of FIG. 3;

FIG. 5 is a fragmentary axial sectional view of a third pressure breaker;

FIG. 6 is a transverse sectional view as seen in the direction of arrows from the line VI—VI of FIG. 5;

FIG. 7 is a fragmentary axial sectional view of a fourth pressure breaker;

FIG. 8 is a transverse sectional view as seen in the direction of arrows from the line VIII—VIII of FIG. 7;

FIG. 9 is a fragmentary axial sectional view of a fifth pressure breaker;

FIG. 10 is a transverse sectional view as seen in the direction of arrows from the line X—X of FIG. 9;

FIGS. 1 to 10 illustrate five embodiments of a pressure breaker which comprises a single wedge-like spreader. The operating means including a piston 2 and a cylinder 1 were omitted in FIGS. 2–10 for the sake of clarity. The piston is connected to the spreader and the cylinder is connected to the pressure bars of the expander.

Figure 11:
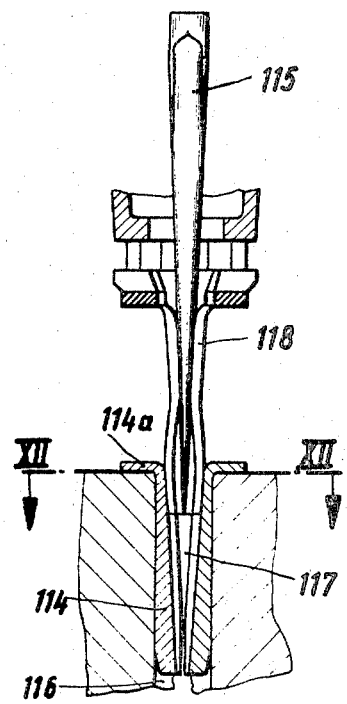
FIG. 11 is a fragmentary sectional view of a rock formation wherein a drill hole receives special configurated inserts which permit cracking of the formation by means of pressure breakers shown in FIGS. 1–10.

A feature common to all of the five embodiments which are illustrated in FIGS. 1 to 10 is that the spreader of the pressure breaker is invariably provided with two or more groups of external surfaces and that the mutual inclination of external surfaces in one group is different from the mutual inclination of surfaces in another group. The same holds true for the internal surfaces of pressure bars in the pressure breaker. Furthermore, the cross-sectional area of that end of each spreader which is connected to the piston 2 (this is the upper end of the spreader shown in FIGS. 1, 4, 5, 7 or 9) is smaller than if the spreader would taper continuously from its tips towards the piston.

Referring to FIGS. 1 and 2 in greater detail, the pressure breaker therein shown includes a spreader 22 which comprises an upper end portion coupled to the piston 2 of the operating means. This spreader 22 comprises three longitudinally spaced portions or sections including an end portion or tip 22c which is bounded by a pair of external surfaces tapering in a direction away from its upper end, i.e., away from the operating means, an intermediate section or portion 22b which is bounded by two parallel external surfaces, and an upper portion or section 22a which is bounded by two external surfaces tapering in the same direction as the surfaces of the end portion 22c. The pressure bars 23, 24 comprise a first pair of internal surfaces provided on their end portions 23b, 24b which taper in the same direction as the external surfaces of the end portion 22c, and these bars also comprise second portions or sections 23a, 24a having internal surfaces which are parallel to each other when the expander including the pressure bars 23, 24 is in underformed state. The portions 23a, 24a then abut against the external surfaces of the second portion 22b of the spreader 22, and the portions 23b, 24b of the pressure bars bear against the external surfaces of the end portion 22c. The pressure bars are preferably made of elongated blanks which are deformed on heating so that they follow the outlines of the corresponding portions of the spreader 22. The internal surfaces of the aforementioned blanks are straight.

When the upper chamber of the cylinder 1 receives pressurized fluid, the piston 2 moves with reference to the cylinder and/or vice versa, so that the spreader 22 moves relative to the pressure bars 23, 24. The portions 22a, 22c respectively move the portions 23a, 24a and 23b, 24b apart to crack the rock formation surrounding the hole which accommodates the parts 22–24.

Figure 12:
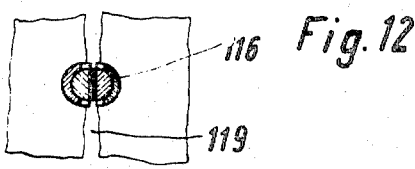
FIG. 12 is a transverse sectional view as seen in the direction of arrows from the line XII—XII of FIG. 11.

FIGS. 3 and 4 illustrate a portion of a second pressure breaker which constitutes a simplified modification of the pressure breaker shown in FIGS. 11 and 12. The spreader 25 has an upper end portion which can be coupled to the piston of the operating means, a lower end portion or tip 25b which is bounded by two external surfaces tapering in a direction away from the operating means, and a further portion 25a which is disposed between the piston of the operating means and the end portion 25b and is bounded by two parallel external surfaces. Thus, the spreader 25 is not provided with a third portion such as would correspond to the portion 22a of the spreader 22 shown in FIG. 1. The pressure bars 23′ 24′ of FIGS. 3 and 4 are identical with the pressure bars 23, 24.

In the embodiment of FIGS. 7 and 8, the spreader 26 comprises a lower end portion 26d which is bounded by a group of surfaces tapering in a direction away from the operating means (not shown), an intermediate portion or second portion 26b which is separated from the end portion 26d by a neck portion 26c and is bounded by two external surfaces tapering in the same direction as the external surfaces of the end portion 26d, and an upper end portion 26a which is bounded by two parallel external surfaces. An important advantage of the spreader 26 is that its transverse dimensions do not exceed a maximum permissible value, i.e., the diameter of the drill hole. In other words, the transverse dimensions of the upper end portion 26a are smaller than if the spreader 26 would taper gradually all the way from its lower end toward the point of connection with the piston. The internal surfaces of the pressure bars 27, 28 shown in FIGS. 7 and 8 are configured in such a way that they abut against the adjoining external surfaces of the spreader when the latter is held in the starting position.

FIGS. 5, 6 and 9, 10 illustrate portions of two pressure breakers wherein the spreaders cause deformation of the respective expanders when they move upwardly, as viewed in these illustrations, namely, in a direction toward the cylinder of the operating means. The spreader 29 of FIG. 5 has a lower end portion 29b bounded by two external surfaces which taper in a direction toward the operating means, i.e., upwardly. The second portion 29a of the spreader 29 is bounded by two parallel external surfaces. The pressure bars 30, 31 of the structure shown in FIGS. 5 and 6 are provided with internal surfaces which abut against the corresponding external surfaces of the spreader 29 when the pressure breaker is idle. It will be seen that the structure of FIGS. 5 and 6 is a functional equivalent of the structure shown in FIGS. 3 and 4. When the spreader 29 moves upwardly, as viewed in FIGS. 5 its portion 29b moves the lower parts of the pressure bars 30, 31 away from each other to thereby crack the rock formation.

The structure shown in FIGS. 9 and 10 is a functional equivalent of the structure illustrated in FIGS. 7 and 8. The spreader 32 has a lower end portion 32d which is bounded by two external surfaces tapering in a direction toward the operating means (not shown), an intermediate portion 32b which is separated from the end portion 32d by a neck portion 32c and is bounded by two external surfaces which taper upwardly, as viewed in FIG. 9, and a further portion 32a which is bounded by two parallel external surfaces. The pressure bars 33, 34 have internal surfaces which abut against the adjoining external surfaces of the spreader 32 when the latter is held in starting position. An important advantage of the structure shown in FIGS. 9 and 10 is seen to reside in that the transversal dimensions of the spreader 32 are less than if the spreader would taper all the way from its lower end to the point of connection with the piston of the operating means.

The embodiments of FIGS. 1–10 solve the problem of effecting substantial widening of the expander in a small-diameter drill hole. This is achieved by imparting to the spreader and/or pressure bars such configuration that the external surfaces of the spreader and/or the internal surfaces of the pressure bars are arranged in two or more longitudinally spaced groups in each of which the mutual inclination of internal or external surfaces is different from the inclination of surfaces in at least one other group. Thus, and if the spreader is provided with two or more groups of external surfaces which are inclined in a manner as shown in FIGS. 1–10, the diameter of the drill hole will be much less than if the spreader were to taper continuously from its tip and all the way to the point of connection with the piston or piston rod.

In the embodiment of FIGS. 1 and 2, the pressure bars 23, 24 will exert different pressures in different axial positions of the spreader 22. Furthermore, the pressure exerted against the surrounding material will be different along different longitudinally spaced sections of the drill hole. The spreader 22 can be made much longer than in heretofore known pressure breakers and the parts 22–24 can be inserted into a relatively long drill hole of small diameter.

An important advantage of the embodiments shown in FIGS. 5–6 and 9–10 is that the spreader 29 or 32 performs useful work while it is subjected to tensional, rather than compressive, stresses. This is important when the pressure breaker is used to crack very hard rock or the like. To my knowledge, all presently known pressure breakers operate in such a way that their spreaders are subjected to compressive stresses, i.e., that the tip of the spreader is the leading end when the spreader is caused to move the pressure bars apart.

As stated before, the pressure bars are preferably made of blanks with straight internal surfaces, and the blanks are deformed upon heating to follow the outline of the spreader. Such mode of producing the pressure bars is desirable because there is no interruption in the texture of the material of which the pressure bars consist. Since the pressure bars follow the outline of the spreader when the latter is held in idle or starting position, they occupy little room and can be fitted into drill holes of small diameter. The elasticity of pressure bars is sufficient to prevent the formation of gaps between the pressure bars and the spreader when the latter is moved from starting position, i.e., the pressure bars will move apart but will continue to follow the outline of the spreader wherever possible. This insures that dust or other foreign matter cannot penetrate between the pressure bars and the spreader and that lubricant remains entrapped between such parts.

In order to further reduce the likelihood of breakage, the lower end portion of each spreader can be made of a material which is harder than the material of the remainder of the spreader. For example, the harder portion can extend along substantially one-fourth of the spreader. Thus, that part of each spreader which is connected to the operating means can be more elastic than the free end portion of the spreader. In order to reduce wear in response to displacement of said spreader means, whole or a part of the internal surfaces of said pressure bars can consist of wear resisting material. For example, wear-resistant layers or coats can be provided on the internal surfaces of the pressure bars, especially in the reinforced lower end portion of the expander, which includes the pressure bar.

Figure 13:
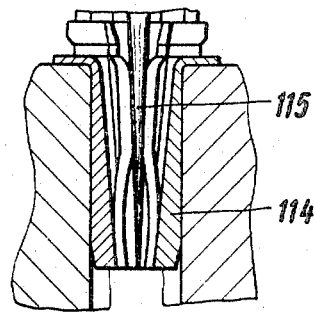
FIG. 13 is a view similar to that of FIG. 11 but showing the pressure bars in fully inserted positions.

Referring finally to FIGS. 11–13, there is shown a further pressure breaker. The numerals 114 denote tapering inserts which can be introduced into a drill hole 116 and have outwardly extending projections or lugs 114a which overlie the surface at the outer end of the hole. The inserts 114 are utilized in connection with the pressure breakers of FIGS. 1–10 or with conventional pressure breakers. The lower end portions of pressure bars 118 (which correspond to or replace the pressure bars 23–24, 23'–24', 30–31, 27–28 or 33–34) are introduced between the inserts 114, and the spreader 115 (corresponding, for example, to spreader 22, 25, 29, 26 or 32) is thereupon caused to move downwardly so that it acts upon the pressure bars 111 which in turn act upon the tapering internal surfaces of the inserts 114. The inserts thereby stress the material around the hole 116 and cause the formation to crack. Each insert is preferably bounded by a substantially semicircular external surface (see FIG. 12). The crack is shown at 119. The numeral 117 denotes in FIG. 11 a space whose cross-sectional area decreases in downward direction and which is defined by the inserts 114 to receive the pressure bars 118. FIG. 13 illustrates the spreader in its upper end position. When the spreader is thereupon caused to move downwardly, it is normally sufficient to shift it through a relatively short distance in order to insure that the inserts 114 form a crack 119 of requisite width so that the formation in which the drill hole 116 is formed is split.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

What is claimed is:

1. A pressure breaker, particularly for cracking of rocky or like formations which are provided with drill holes, comprising an elongated expander insertable into a drill hole and including a plurality of pressure bars; a wedge-like spreader received between said pressure bars; and operating means for effecting relative movement between said spreader and said expander, including a fluid-actuated cylinder and a piston connected with said spreader and reciprocably received in said cylinder, said spreader having at least two groups of longitudinally spaced external spreading surfaces and the surfaces of each group making with each other an angle which is different from the angle between the surfaces of another group, said pressure bars having at least one group of internal surfaces cooperating with said external surfaces to increase the transverse dimensions of said expander in response to relative movement between said spreader and said pressure bars whereby the pressure bars exert a pressure against the material surrounding the drill hole.

2. A pressure breaker as defined in claim 1, wherein said spreader has an end portion remote from said piston and bounded by a group of external surfaces which diverge in a direction toward said piston and a second portion adjacent to said end portion and bounded by a group of parallel external surfaces.

3. A pressure breaker as defined in claim 2, wherein said spreader further comprises a third portion between said second portion and said piston and bounded by a group of external surfaces which taper toward said second portion.

4. A pressure breaker as defined in claim 1, wherein said spreader comprises an end portion and a second portion between said end portion and said piston, each of said portions being bounded by a group of said external surfaces which taper in a direction away from said piston, said spreader being further provided with a neck portion intermediate said end portion and said second portion.

5. A pressure breaker as defined in claim 1, wherein said expander has an end remote from said operating means and wherein at least one group of said external surfaces tapers toward said operating means so that said pressure bars are moved apart in response to movement of said spreader away from said end of the expander.

6. A pressure breaker a defined in claim 5, wherein said one group of external surfaces is provided at that end of said spreader which is remote from said operating means, said spreader comprising an intermediate portion bounded by a group of parallel external surfaces.

7. A pressure breaker as defined in claim 5, wherein said spreader further comprises an intermediate portion bounded by another group of external surfaces which also taper toward said operating means, and a neck portion disposed between said one and said other group of external surfaces.

8. A pressure breaker as defined in claim 1, wherein said spreader is movable to and from a starting position corresponding to the undeformed condition of said pressure bars, said bars being tightly fitted into a drill hole and their internal surfaces being in abutment with said external surfaces in said starting position of the spreader.

9. A pressure breaker as defined in claim 8, wherein said pressure bars are obtained by deformation of blanks having straight parallel internal surfaces.

10. A pressure breaker as defined in claim 1, wherein said piston pulls the spreader when the pressure bars exert a pressure against the material surrounding the drill hole.

11. A pressure breaker as defined in claim 1, wherein said piston pushes the spreader when the pressure bars exert a pressure against the material surrounding the drill hole.

12. A pressure breaker as defined in claim 1, wherein said spreader comprises portions of different hardness.

13. A pressure breaker as defined in claim 12, wherein said spreader comprises a portion of maximum hardness located at that end thereof which is remote from said piston.

14. A pressure breaker as defined in claim 1, further comprising at least one insert insertable into the drill hole outwardly of at least one of said pressure bars to transmit pressure to the material around the drill hole in response to movement of the spreader relative to said pressure bars.

15. A pressure breaker as defined in claim 14, comprising a pair of substantially concavo-convex inserts defining between themselves a space which tapers in a direction away from the open end of the drill hole.

16. A pressure breaker as defined in claim 14, wherein said insert comprises a projection overlying the surface at the open end of the drill hole.

17. A pressure breaker as defined in claim 1, wherein said pressure bars have internal surfaces consisting at least partially of wear resistant material to reduce wear in response to displacement of said spreader means.

References Cited

UNITED STATES PATENTS

| 398,742 | 2/1889 | Mould | 299—22 X |
|---|---|---|---|
| 2,290,824 | 7/1942 | Johnson | 299—23 |

FOREIGN PATENTS 5,990  9/1907  Great Britain.

ERNEST R. PURSER, Primary Examiner